Figure 1:
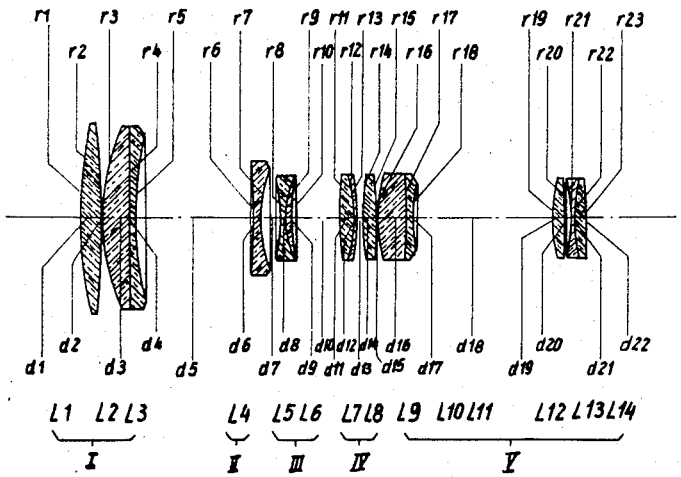

Aug. 15, 1967     K. H. MACHER     3,336,094

VARIFOCAL TELEOBJECTIVE WITH MOVABLE NEGATIVE COMPONENTS

Filed Jan. 16, 1963

Inventor:
KARL H. MACHER

Karl G. Ross
AGENT

United States Patent Office 3,336,094
Patented Aug. 15, 1967

3,336,094
VARIFOCAL TELEOBJECTIVE WITH MOVABLE
NEGATIVE COMPONENTS
Karl Heinrich Macher, Bad Kreuznach, Rhineland, Germany, assignor to Jos. Schneider & Co. Optische Werke, Bad Kreuznach, Rhineland, Germany, a corporation of Germany
Filed Jan. 16, 1963, Ser. No. 251,962
Claims priority, application Germany, Jan. 20, 1962, Sch 30,859
4 Claims. (Cl. 350—184)

My present invention relates to a varifocal objective of the general type comprising a fixed rear component of, preferably, four air-spaced lens members and an adjustable front lens member and an adjustable front lens group of two fixed outer components of positive refractivity and two movable inner components of negative refractivity, e.g. as disclosed in copending applications Ser. No. 126,306, filed July 24, 1961 by Günter Klemt and me, now abandoned.

The general object of this invention is to provide a telephoto objective of this character, adaptive to serve as a so-called zoom lens for photographic or cinematographic purposes, which is more compact than prior constructions and can thus be used with advantage for small-size still pictures (e.g. of 24 by 36 mm.) and motion pictures (e.g. 35-mm. film).

A prerequisite in such objectives is their adjustability over a wide range of focal lengths with a stationary image plane, i.e. with no change in their back-focal distance so that no visual refocusing is needed during zooming, while the residual aberrations are to remain substantially constant throughout this range. The invention aims at satisfying this requirement in a telephoto zoom lens of small dimensions and correspondingly low weight.

In accordance with this invention I provide a varifocal objective of the general character set forth above, having means for so displacing the two negative components of the front or object-side lens group as to maintain the position of the image plane of the system constant throughout a range of adjustments between a minimum overall focal length $f_{min}$ and a maximum overall focal length $f_{max}$, wherein the sum of the three variable air spaces of this front group (before, between and behind the movable negative components) is less than the aforesaid minimum focal length $f_{min}$. To this end, according to a more particular feature of my invention, I so dimension the powers of the components of the adjustable front group that the individual focal length of the positive first component is less than double the group focal length of the fixed rear component (though preferably greater than that focal length) whereas the absolute values of the individual focal lengths of the three remaining components of the front group are each less than the focal length of the rear component.

I have further found, in accordance with another feature of the instant invention, that for the purpose of minimizing and equalizing the residual abberations it is desirable to provide a relatively low index of refraction—less than 1.6—for the lens or lenses of the first movable component and to design the second movable component in such manner that its front surface is concave toward the object (i.e. toward the side of the longer light rays) and has a radius of curvature whose absolute value exceeds 65% of the absolute value of the individual focal length of this particular component; the latter requirement will be satisfied, for example, by a lens member whose average refractive index is greater than 1.65 and whose rear curvature has a radius of large absolute value compared with the aforementioned radius of the front surface.

Figure 2:
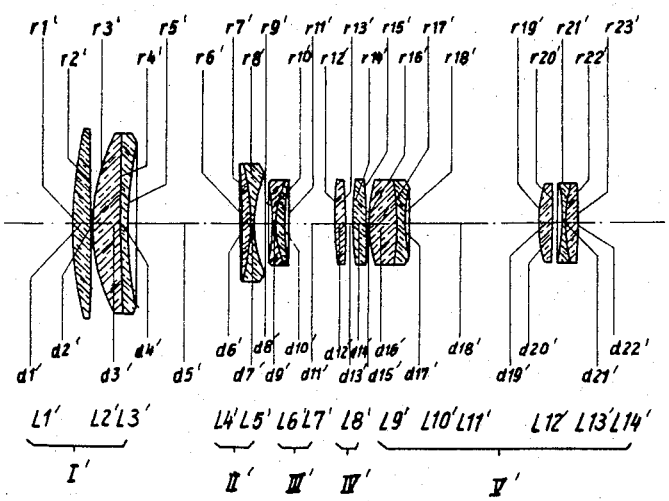

Two representative embodiments of my invention have been illustrated diagrammatically in FIGS. 1 and 2 of the accompanying drawing. In each instance there is shown a varifocal telephoto objective with an overall focal length adjustable between 80 and 240 mm., a relative aperture of 1:4 and an image size of 24 by 36 mm.

The system of FIG. 1 comprises an adjustable front lens group, consisting of four air-spaced components I, II, III and IV, and a fixed rear component V. Component I is positively refracting and is constituted by a biconvex first lens L1 (radii $r1$, $r2$ and thickness $d1$) and a meniscus-shaped doublet composed of a nearly planoconvex second lens L2 (radii $r3$, $r4$ and thickness $d3$) and an approximately planoconcave third lens L3 (radii $r4$, $r5$ and thickness $d4$), the two members L1 and L2/L3 being separated from each other by a small air space $d2$. Component II, separated from component I by a variable air space $d5$, is a biconcave singlet L4 (radii $r6$, $r7$ and thickness $d6$) and is followed, after another variable air space $d7$, by a negative doublet composed of a biconcave lens L5 (radii $r8$, $r9$ and thickness $d8$) and a meniscus-shaped positive lens L6 (radii $r9$, $r10$ and thickness $d9$). Component IV, which follows a further variable air space $d10$, is a positive doublet composed of a biconvex lens L7 (radii $r11$, $r12$ and thickness $d11$) and a negative meniscus L8 (radii $r12$, $r13$ and thickness $d12$). A fixed air space $d13$ separates front group I–IV from rear component V which is constituted by four air-spaced lens members of which the first one is a positive lens L9 (radii $r14$, $r15$ and thickness $d14$), the second one—separated from it by an air space $d15$—is a doublet composed of a positive lens L10 (radii $r16$, $r17$ and thickness $d16$) and a negative lens L11 (radii $r17$, $r18$ and thickness $d17$), the third one follows after a large air space $d18$ (which may accommodate a diaphragm and/or shutter) and consists of a single biconvex lens L12 (radii $r19$, $r20$ and thickness $d19$), and the fourth one is another doublet which is separated from lens L12 by an air space $d20$ and consists of a biconcave lens L13 (radii $r21$, $r22$ and thickness $d21$) cemented onto a positive lens L14 (radii $r22$, $r23$ and thickness $d22$).

In the following Table A there have been given representative values for the radii $r1$ to $r23$, the thicknesses and separation $d1$ to $d22$, the refractive indices $n_d$ and the Abbé numbers $v$ of the lenses L1 to L14 of the system of FIG. 1; the linear parameters $r1$ to $r23$ and $d1$ to $d22$ are listed in millimeters although, of course, the proportions would be the same for other units of length.

TABLE A

|  |  |  |  | $n_d$ | $\nu$ |
|---|---|---|---|---|---|
| I | L1 | $r1 = +143.44$ | $d1 = 8.40$ | 1.52542 | 64.6 |
|  |  | $r2 = -339.40$ | $d2 = 0.15$ | Air space | |
|  | L2 | $r3 = +77.72$ | $d3 = 9.73$ | 1.50378 | 66.7 |
|  | L3 | $r4 = +1,487.50$ | $d4 = 2.87$ | 1.76180 | 27.0 |
|  |  | $r5 = +133.18$ | $d5 = 43.66$ | Variable air space | |
| II | L4 | $r6 = -210.00$ | $d6 = 2.64$ | 1.48749 | 70.0 |
|  |  | $r7 = +47.26$ | $d7 = 6.98$ | Variable air space | |
| III | L5 | $r8 = -61.98$ | $d8 = 1.20$ | 1.73350 | 51.0 |
|  |  | $r9 = +33.13$ | $d9 = 4.70$ | 1.78470 | 26.1 |
|  | L6 | $r10 = +420.00$ | $d10 = 16.75$ | Variable air space | |
| IV | L7 | $r11 = +168.25$ | $d11 = 5.16$ | 1.62041 | 60.3 |
|  | L8 | $r12 = -45.40$ | $d12 = 1.26$ | 1.62004 | 36.3 |
|  |  | $r13 = -90.90$ | $d13 = 2.40$ | Air space | |
| V | L9 | $r14 = +106.20$ | $d14 = 5.11$ | 1.53375 | 55.4 |
|  |  | $r15 = -273.80$ | $d15 = 0.20$ | Air space | |
|  | L10 | $r16 = +46.39$ | $d16 = 11.27$ | 1.49388 | 66.1 |
|  | L11 | $r17 = -130.34$ | $d17 = 3.07$ | 1.78470 | 26.1 |
|  |  | $r18 = +87.16$ | $d18 = 51.00$ | Air space | |
|  | L12 | $r19 = +58.96$ | $d19 = 4.10$ | 1.53172 | 48.9 |
|  |  | $r20 = -303.00$ | $d20 = 3.30$ | Air space | |
|  | L13 | $r21 = -51.43$ | $d21 = 1.50$ | 1.74400 | 44.9 |
|  | L14 | $r22 = +77.61$ | $d22 = 4.00$ | 1.69895 | 30.1 |
|  |  | $r23 = -291.40$ | $d_{total} = 189.45$ | | |

The individual focal lengths of the components I, II, III, IV and the partial focal length of the rear objective portion V in the system of Table A are as follows:

$$f_I = +151.07$$
$$f_{II} = -78.60$$
$$f_{III} = -82.16$$
$$f_{IV} = +95.78$$
$$f_V = +123.58$$

It will be noted that the sum of the three variable air spaces $d5$, $d7$ and $d10$ in the foregoing example equals 67.39 mm. and is thus less than the minimum focal length of 80 mm.; also, the front radius $r8$ of the second movable component III has an absolute value of 61.98 which is greater than 0.65 times the individual focal length $f_{III}$ of that component.

The system of FIG. 2 differs structurally from that of FIG. 1 in that the first movable component II' is now a doublet, composed of a positive lens L4' and a negative lens L5', while the second fixed component IV', is a single biconvex lens L8'. Representative values for the radii $r1'$ to $r23'$, the thicknesses and separations $d1'$ to $d22'$, the refractive indices $n_d$ and the Abbé numbers $\nu$ of the lenses L1' to L14' of the components I' to V' in the system of FIG. 2 are given in the following Table B.

TABLE B

|  |  |  |  | $n_d$ | $\nu$ |
|---|---|---|---|---|---|
| I' | L1' | $r1' = +143.44$ | $d1' = 8.40$ | 1.52542 | 64.6 |
|  |  | $r2' = -333.80$ | $d2' = 0.15$ | Air space | |
|  | L2' | $r3' = +77.55$ | $d3' = 9.73$ | 1.50378 | 76.7 |
|  | L3' | $r4' = +1,288.00$ | $d4' = 2.87$ | 1.78470 | 26.1 |
|  |  | $r5' = +134.64$ | $d5' = 42.82$ | Variable air space | |
| II' | L4' | $r6' = -210.00$ | $d6' = 3.00$ | 1.50137 | 56.5 |
|  | L5' | $r7' = -80.20$ | $d7' = 1.50$ | 1.48749 | 70.00 |
|  |  | $r8' = +46.39$ | $d8' = 6.90$ | Variable air space | |
| III' | L6' | $r9' = -62.70$ | $d9' = 1.20$ | 1.73350 | 51.0 |
|  | L7' | $r10' = +32.91$ | $d10' = 4.70$ | 1.78470 | 26.1 |
|  |  | $r11' = +389.00$ | $d11' = 17.74$ | Variable air space | |
| IV' | L8' | $r12' = +160.50$ | $d12' = 4.00$ | 1.62041 | 60.3 |
|  |  | $r13' = -93.76$ | $d13' = 2.40$ | Air space | |
| V' | L9' | $r14' = +106.20$ | $d14' = 5.11$ | 1.52542 | 64.6 |
|  |  | $r15' = -258.60$ | $d15' = 0.20$ | Air space | |
|  | L10' | $r16' = +46.39$ | $d16' = 11.27$ | 1.62280 | 56.9 |
|  | L11' | $r17' = -86.16$ | $d17' = 3.07$ | 1.78470 | 26.1 |
|  |  | $r18' = +60.13$ | $d18' = 51.00$ | Air space | |
|  | L12' | $r19' = +58.96$ | $d19' = 4.10$ | 1.53172 | 48.9 |
|  |  | $r20' = -303.00$ | $d20' = 3.30$ | Air space | |
|  | L13' | $r21' = -52.48$ | $d21' = 1.50$ | 1.74400 | 44.9 |
|  | L14' | $r22' = +58.56$ | $d22' = 4.00$ | 1.69895 | 30.1 |
|  |  | $r23' = -257.20$ | $d_{total} = 188.96$ | | |

The individual focal lengths of the components I', II', III', IV' and the partial focal length of the rear objective portion V' in the system of Table B are as follows:

$$f_{I'} = +151.45$$
$$f_{II'} = -78.65$$
$$f_{III'} = -82.12$$
$$f_{IV'} = +95.60$$
$$f_{V'} = +123.48$$

Again, the sum of the variable air spaces $d5'$, $d8'$ and $d11'$ is less than $f_{min}$ (80 mm.) since it equals only 67.46 mm.; front radius $r9'$ component III' has an absolute value of 62.70 and is thus greater than 0.65 times the individual focal length $f_{III'}$ of that component.

The values for the variable air spaces given in Tables A and B are for an intermediate position of adjustment in which the overall focal length has a value of 160 mm. Following are the corresponding values for different positions of adjustment:

FIG. 1

| $d5$ | $d7$ | $d10$ | $f$ |
|---|---|---|---|
| 4.69 | 33.85 | 28.85 | 80 |
| 43.66 | 6.98 | 16.75 | 160 |
| 59.22 | 7.27 | 0.90 | 240 |

FIG. 2

| $d5'$ | $d8'$ | $d11'$ | $f$ |
|---|---|---|---|
| 3.78 | 33.91 | 29.76 | 80 |
| 42.82 | 6.90 | 17.74 | 160 |
| 58.42 | 7.07 | 1.96 | 240 |

I claim:
1. An optical objective system comprising a fixed rear component constituted by four air-spaced members and a front lens group constituted by four air-spaced components including a fixed positive first component, a movable negative second component, a movable negative third component and a fixed positive fourth component, the mobility of said second and third components enabling adjustment of the overall focal length of the system between a minimum value $f_{min}$ and a maximum value $f_{max}$, said second and third components being separated from said first and fourth components and from each other by three variable air spaces, said second and third components being movable relatively to each other and to said first and fourth components into a first position wherein said system has a relatively short focal length, an intermediate position of intermediate focal length and a third position of relatively large focal length, said first component consisting of a positive singlet and a cemented positive meniscus airspaced from said singlet, said first component I, said second component II, said third component III, said fourth component IV and said rear component V being constituted by lenses L1 to L14 having radii r1 to r23 and thicknesses and separations d1 to d22 whose numerical values, based upon a value $f=160$ units for said intermediate overall focal length, together with their refractive indices $n_d$ and Abbé number $\nu$ are substantially as given in the following table, with d5, d7 and d10 as given for said intermediate position.

TABLE A

| | | | | | $n_d$ | $\nu$ |
|---|---|---|---|---|---|---|
| I | L1 | r1 = +143.44 | d1 = | 8.40 | 1.52542 | 64.6 |
| | | r2 = −339.40 | d2 = | 0.15 | Air space | |
| | L2 | r3 = +77.72 | d3 = | 9.73 | 1.50378 | 66.7 |
| | L3 | r4 = +1,487.50 | d4 = | 2.87 | 1.76180 | 27.0 |
| | | r5 = +133.18 | d5 = | 43.66 | Variable air space | |
| II | L4 | r6 = −210.00 | d6 = | 2.64 | 1.48749 | 70.0 |
| | | r7 = +47.26 | d7 = | 6.98 | Variable air space | |
| III | L5 | r8 = −61.98 | d8 = | 1.20 | 1.73350 | 51.0 |
| | L6 | r9 = +33.13 | d9 = | 4.70 | 1.78470 | 26.1 |
| | | r10 = +420.00 | d10 = | 16.75 | Variable air space | |
| IV | L7 | r11 = +168.25 | d11 = | 5.16 | 1.62041 | 60.3 |
| | L8 | r12 = −45.40 | d12 = | 1.26 | 1.62004 | 36.3 |
| | | r13 = −90.90 | d13 = | 2.40 | Air space | |
| V | L9 | r14 = +106.20 | d14 = | 5.11 | 1.53375 | 55.4 |
| | | r15 = −273.80 | d15 = | 0.20 | Air space | |
| | L10 | r16 = +46.39 | d16 = | 11.27 | 1.49388 | 66.1 |
| | L11 | r17 = −130.34 | d17 = | 3.07 | 1.78470 | 26.1 |
| | | r18 = +87.16 | d18 = | 51.00 | Air space | |
| | L12 | r19 = +58.96 | d19 = | 4.10 | 1.53172 | 48.9 |
| | | r20 = −303.00 | d20 = | 3.30 | Air space | |
| | L13 | r21 = −51.43 | d21 = | 1.50 | 1.74400 | 44.9 |
| | L14 | r22 = +77.61 | d22 = | 4.00 | 1.69895 | 30.1 |
| | | r23 = −291.40 | | | | |
| | | $d_{total}=189.45$ | | | | |

2. An optical objective system comprising a fixed rear component constituted by four air-spaced members and a front lens group constituted by four air-spaced components including a fixed positive first component, a movable negative second component, a movable negative third component and a fixed positive fourth component, the mobility of said second and third components enabling adjustment of the overall focal length of the system between a minimum value $f_{min}$ and a maximum value $f_{max}$, said second and third components being separated from said first and fourth components and from each other by three variable air spaces, said second and third components being movable relatively to each other and to said first and fourth components into a first position wherein said system has a relatively short focal length, an intermediate position of intermediate focal length and a third position of relatively large focal length, said first component consisting of a positive singlet and a cemented positive meniscus air-spaced from said singlet, said first component I', said second component II', said third component III', said fourth component IV' and said rear component V' being constituted by lenses L1' to L14' having radii r1' to r23' and thicknesses and separations d1' to d22' whose numerical values, based upon a value $f'=160$ units for an intermediate overall focal length, together with their refractive indices $n_d$ and Abbé numbers $\nu$ are substantially as given in the following table, with d5', d8' and d11' given for said intermediate position:

TABLE B

| | | | | | $n_d$ | $\nu$ |
|---|---|---|---|---|---|---|
| I' | L1' | r1' = +143.44 | d1' = | 8.40 | 1.52542 | 64.6 |
| | | r2' = −333.80 | d2' = | 0.15 | Air space | |
| | L2' | r3' = +77.55 | d3' = | 9.73 | 1.50378 | 76.7 |
| | L3' | r4' = +1,288.00 | d4' = | 2.87 | 1.78470 | 26.1 |
| | | r5' = +134.64 | d5' = | 42.82 | Variable air space | |
| II' | L4' | r6' = −210.00 | d6' = | 3.00 | 1.50137 | 56.5 |
| | L5' | r7' = −80.20 | d7' = | 1.50 | 1.48749 | 70.00 |
| | | r8' = +46.39 | d8' = | 6.90 | Variable air space | |
| III' | L6' | r9' = −62.70 | d9' = | 1.20 | 1.73350 | 51.0 |
| | L7' | r10' = +32.91 | d10' = | 4.70 | 1.78470 | 26.1 |
| | | r11' = +389.00 | d11' = | 17.74 | Variable air space | |
| IV' | L8' | r12' = +160.50 | d12' = | 4.00 | 1.62041 | 60.3 |
| | | r13' = −93.76 | d13' = | 2.40 | Air space | |
| | L9' | r14' = +106.20 | d14' = | 5.11 | 1.52542 | 64.6 |
| | | r15' = −258.60 | d15' = | 0.20 | Air space | |
| | L10' | r16' = +46.39 | d16' = | 11.27 | 1.62280 | 56.9 |
| V' | L11' | r17' = −86.16 | d17' = | 3.07 | 1.78470 | 26.1 |
| | | r18' = +60.13 | d18' = | 51.00 | Air space | |
| | L12' | r19' = +58.96 | d19' = | 4.10 | 1.53172 | 48.9 |
| | | r20' = −303.00 | d20' = | 3.30 | Air space | |
| | L13' | r21' = −52.48 | d21' = | 1.50 | 1.74400 | 44.9 |
| | L14' | r22' = +58.56 | d22' = | 4.00 | 1.69895 | 30.1 |
| | | r23' = −257.20 | | | | |
| | | $d_{total}=188.96$ | | | | |

3. An optical objective system comprising a fixed rear component constituted by four air-spaced members and a front lens group constituted by four air-spaced components including a fixed positive first component, a movable negative second component, a movable negative third component and a fixed positive fourth component, the mobility of said second and third components enabling adjustment of the overall focal length of the system between a minimum value $f_{min}$ and a maximum value $f_{max}$, said second and third components being separated from said first and fourth components and from each other by three variable air spaces, said second and third components being movable relatively to each other and to said first and fourth components into a first position wherein said system has a focal length of numerical value 80, an intermediate position of focal length of numerical value 160 and a third position of focal length of numerical value 240, the numerical values of the individual focal lengths $f_I$, $f_{II}$, $f_{III}$, $f_{IV}$ and $f_V$ of said first, second, third, fourth and rear components being substantially as follows:

$$f_{III} = -82.16$$
$$f_{IV} = +95.78$$
$$f_V = +123.58$$
$$f_I = +151.07$$
$$f_{II} = -78.60$$

the numerical values of the variable air spaces in said first, second and third positions being substantially as follows:

|  | First Space | Second Space | Third Space |
|---|---|---|---|
| First Position | 4.69 | 33.85 | 28.85 |
| Second Position | 43.66 | 6.98 | 16.75 |
| Third Position | 59.22 | 7.27 | 0.90 |

4. An optical objective system comprising a fixed rear component constituted by four air-spaced members and a front lens group constituted by four air-spaced components including a fixed positive first component, a movable negative second component, a movable negative third component and a fixed positive fourth component, the mobility of said second and third components enabling adjustment of the overall focal length of the system between a minimum value $f_{min}$ and a maximum value $f_{max}$, said second and third components being separated from said first and fourth components and from each other by three variable air spaces, said second and third components being movable relatively to each other and to said first and fourth components into a first position wherein said system has a focal length of numerical value 80, an intermediate position of focal length of numerical value 160 and a third position of focal length of numerical value 240, the numerical values of the individual focal lengths $f_{I'}$, $f_{II'}$, $f_{III'}$, $f_{IV'}$, and $f_{V'}$ of said first, second, third, fourth and rear components being substantially as follows:

$$f_{I'} = +151.45$$
$$f_{II'} = -78.65$$
$$f_{III'} = -82.12$$
$$f_{IV'} = +95.60$$
$$f_{V'} = +123.48$$

the numerical values of the variable air spaces in said first, second and third positions being substantially as follows:

|  | First Space | Second Space | Third Space |
|---|---|---|---|
| First Position | 3.78 | 33.91 | 29.76 |
| Second Position | 42.82 | 6.90 | 17.74 |
| Third Position | 58.42 | 7.07 | 1.96 |

References Cited

UNITED STATES PATENTS 3,267,803   8/1966   Macher et al. -------- 88—57

FOREIGN PATENTS 1,292,894   3/1962   France.

JEWELL H. PEDERSEN, *Primary Examiner.*

JOHN K. CORBIN, *Examiner.*